(12) United States Patent
Laude

(10) Patent No.: US 6,219,473 B1
(45) Date of Patent: Apr. 17, 2001

(54) OPTICAL FIBER WAVELENGTH MULTIPLEXER-DEMULTIPLEXER

(75) Inventor: Jean-Pierre Laude, St-Cyr-la-Riviére par Saclas (FR)

(73) Assignee: Jobin Yvon Sa, Longjumeau (FR)

( * ) Notice: Subject to any disclaimer, the term of this patent is extended or adjusted under 35 U.S.C. 154(b) by 0 days.

(21) Appl. No.: 09/089,049

(22) Filed: Jun. 2, 1998

(30) Foreign Application Priority Data

Jun. 9, 1997 (FR) .................................................. 97 07128

(51) Int. Cl.[7] ...................................................... G02B 6/42
(52) U.S. Cl. ................................. 385/24; 385/33; 385/35; 385/37
(58) Field of Search ........................ 385/24, 31, 33–35, 385/37; 359/124, 131, 569

(56) References Cited

U.S. PATENT DOCUMENTS

| | | | |
|---|---|---|---|
| 4,622,662 | * | 11/1986 | Laude et al. ............................. 385/37 |
| 4,675,860 | * | 6/1987 | Laude et al. ............................. 385/37 |
| 4,736,360 | | 4/1988 | McMahon ............................... 385/37 |
| 4,744,618 | * | 5/1988 | Mahlein .................................. 385/37 |
| 5,305,402 | * | 4/1994 | Hill et al. ................................ 385/25 |
| 6,011,884 | * | 1/2000 | Dueck et al. ........................... 385/37 |

FOREIGN PATENT DOCUMENTS 0 242 574  3/1987 (EP) .

OTHER PUBLICATIONS

R. S. Longhurst: "Geometric and Physical Optics", 1973, Longman, London and New York, pp. 402–406.
M. Born: "Optik", 1972, Springer, Berlin Heidelberg New York, pp. 58–60.
A.M.J. Koonen: "A Compact Wavelength Demultiplexer Using Both Interference Filters and Diffraction Grating", 7th European Conference on Optical Communication, Sep. 8–11, 1981, Copenhagen, pp. 8.5–1–8.5–4.

* cited by examiner

*Primary Examiner*—Hemang Sanghavi
(74) *Attorney, Agent, or Firm*—Arent Fox Kintner Plotkin & Kahn, PLLC

(57) ABSTRACT

The present invention relates to an optical fiber wavelength multiplexer-demultiplexer or router comprising a dispersing system (6) and a reflecting system (9) having a focus, whereas the extremities of the input (2) and output (3) fibers are located in the vicinity of the said focus, It comprises an optical doublet (10–12) correcting the geometrical and chromatic aberrations of the assembly.

12 Claims, 2 Drawing Sheets

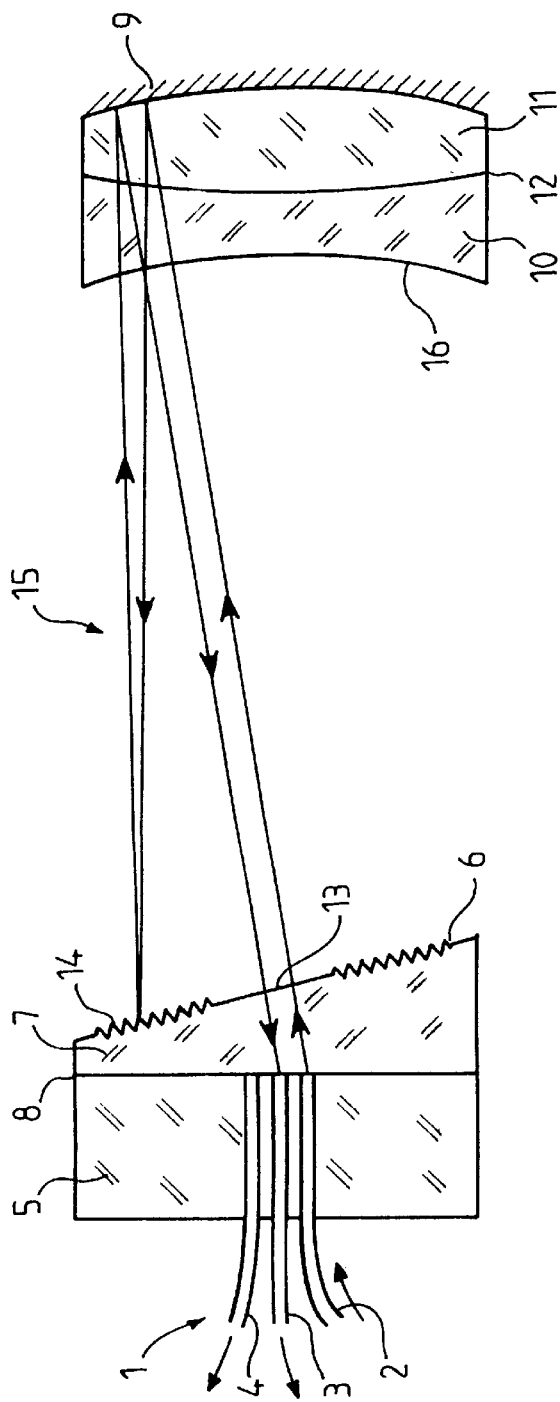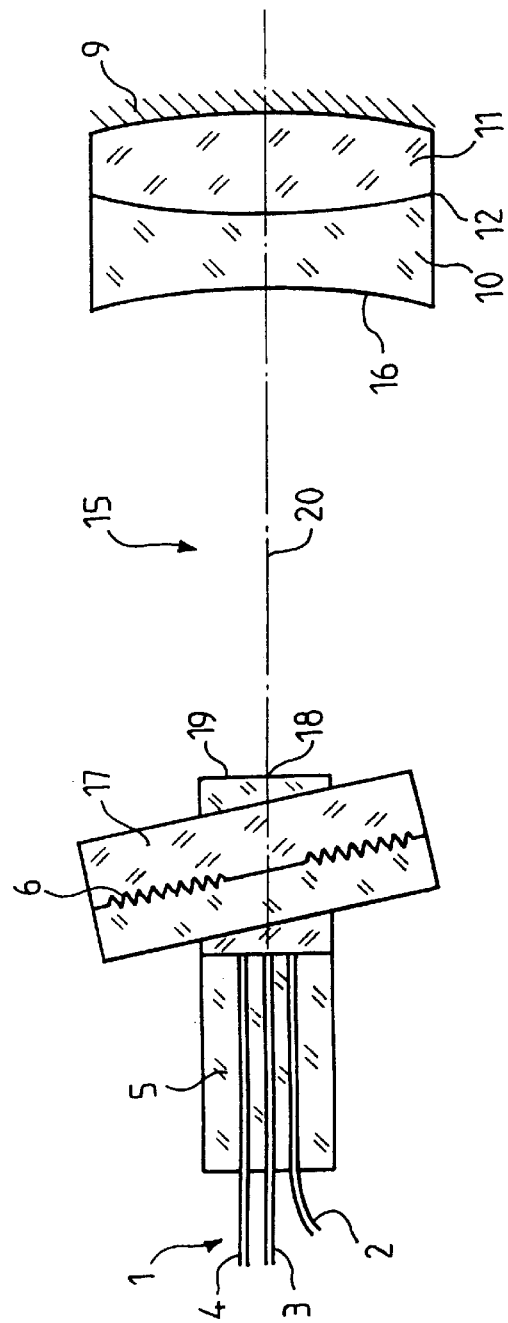

OPTICAL FIBER WAVELENGTH MULTIPLEXER-DEMULTIPLEXER

BACKGROUND OF THE INVENTION

This invention relates an optical fiber wavelength multiplexer-demultiplexer or router, liable to be used as a component in optical fiber teletransmission installations.

Such multiplexers-demultiplexers are already known; they have been described, then gradually improved, especially in the French patents FR-2.543.768, FR-2.519.148, FR-2.479.981, FR-2.496.260 and in the European patent EP-0.196.963.

The latter document relates more particularly to a multiplexer-demultiplexer in which the input and output fibers are positioned at the immediate vicinity of the focus of a concave mirror. Thus, the diverging light fluxes received from the input fibers are transformed by the concave mirror into parallel light beams which are addressed to a plane diffraction grating, which directs the parallel beams back to the concave mirror and focuses them onto the extremities of the output fibers.

We have sought to reduce the aberrations and, in particular, the spherical aberrations of such a system and it is thus that such a multiplexer-demultiplexer has been suggested, comprising a fiber-holder element, an element carrying the diffraction grating, an intermediate element and a spherical mirror element. The fiber-holder element puts the extremities of the fibers in contact with the element carrying the diffraction grating, the intermediate element which is in contact with the diffraction grating and has the same optical index as the element which carries it, is terminated by a spherical face which is in contact with the mirror.

This device has proven satisfactory, has enabled and still enables numerous embodiments.

However, in certain particular applications, this component has appeared regrettably relatively heavy, as well as its thermal instability produced by the index variation of the different elements of which it consists, in relation to temperature.

OBJECTS AND SUMMARY OF THE INVENTION

The aim of this invention is to remedy these shortcomings and hence to offer a multiplexer-demultiplexer exhibiting the same advantages as that introduced above, with the additional corrections made to spherical and chromatic aberrations, but with reduced weight and, moreover, good thermal stability.

The invention thus relates to an optical fiber wavelength multiplexer-demultiplexer comprising a dispersing system and a reflecting system fitted with a focus. The extremities of the input and output fibers are located close to the focus.

While determining the number of input fibers, of output fibers and the dispersing system, a router can also be produced.

According to the invention, this multiplexer-demultiplexer comprises an optical doublet for correction of the spherical and chromatic aberrations of the assembly.

Thus, a vast portion of the space between the dispersing system and the reflecting system is occupied by air, a gas or vacuum.

The doublet is coupled at the same time to the dispersing system and to the reflecting system, so that a beam emitted by an input fiber crosses several times the doublet. The doublet thus allows successively acting on such a beam during its repeated passages in such a way that the beam resulting from all the passages through the doublet is corrected from its geometrical and chromatic aberrations.

In relation to the previous device, which does not contain any element between the diffraction grating and the mirror, good correction of the spherical aberrations and of the chromatic aberrations can be obtained, which improves significantly the performances of the multiplexer-demultiplexer.

In relation to the other previous device, in which an intermediate optical block links the diffraction grating to the spherical mirror, the device of the invention enables to obtain significant weight reduction of the multiplexer-demultiplexer.

Moreover, the invention device enables to obtain such a multiplexer-demultiplexer exhibiting significantly improved thermal stability.

According to different preferred embodiments each exhibiting their particular advantages:

- the doublet is in direct contact with the reflecting optical system,
- the doublet operates in the vicinity of the Young points (still known under the name of Weierstrass points) of its input face,
- the dispersing system is a grating,
- the reflecting optical system is a concave mirror,
- the optical doublet is a doublet comprising two lenses whose second lens has a reflecting convex external face,
- the first lens is made of a glass known under the reference PSK3 and the second lens is made of a glass known under the reference BaF52,
- the second lens has a center thickness equal to 7.66 mm and curves of its external face and of an internal face opposed to that external face which are respectively equal to 401.56 mm and to 748.90 mm, the first lens has a curve of its face opposed to the second lens which is equal to 217.77 mm, and the external face of the second lens and the dispersing system are 271.1 mm apart,
- the reflecting system is plane,
- the dispersing system, on one hand, and the reflecting system and the doublet, on the other hand, are assembled by means of a material with low expansion coefficient.

Moreover, the device is advantageously used in near infrared, notably at 1550 mm.

BRIEF DESCRIPTION OF THE DRAWINGS

The invention will be described more in detail with reference to the appended figures on which:

FIG. 1 is a first embodiment of the invention implementing a spherical mirror;

FIG. 2 represents a second embodiment of the invention;

DETAILED DESCRIPTION OF PREFERRED EMBODIMENTS

Figure 3:
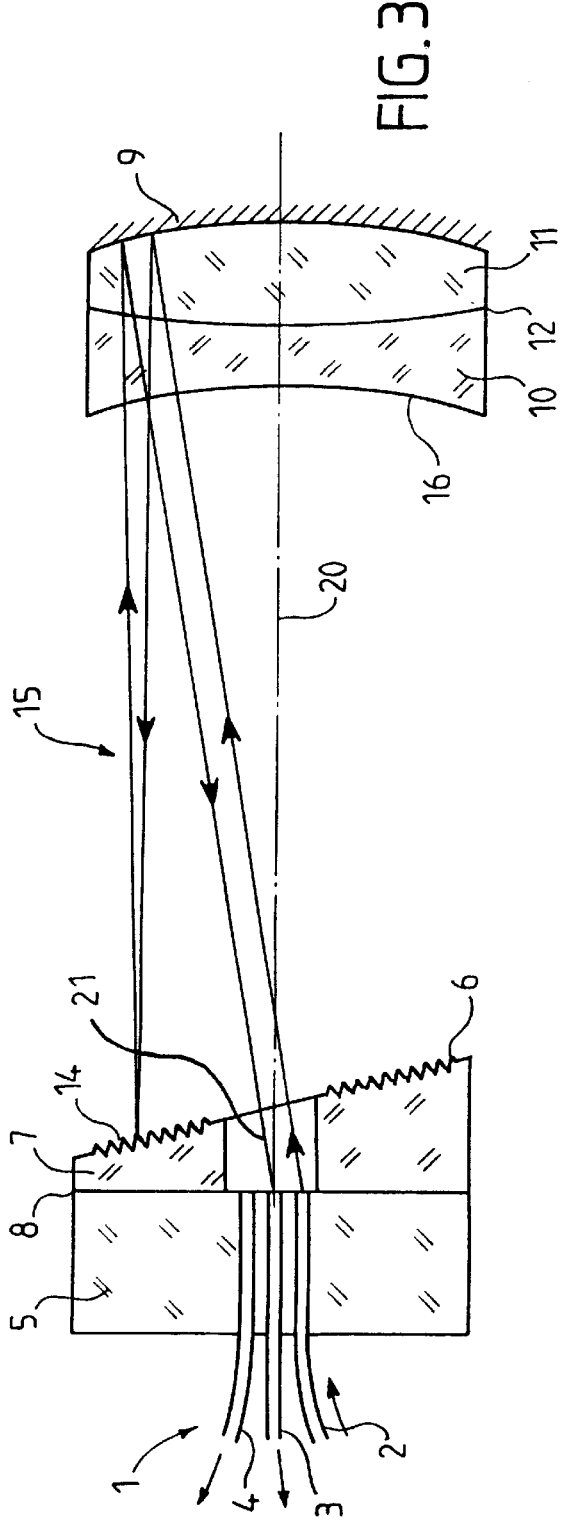
FIG. 3 represents a third embodiment.

The Figures representing the optical components of the device of the invention, independently from the mechanical structures which carry them and see to their respective positioning. These mechanical structures can take on numerous forms and are accessible to the man of the art.

The present description has been prepared with reference to the usage of optical fibers as input and output means of the multiplexer-demultiplexer. It is well known that there are emitting components (diodes or diode bars) and receiving components (CCDs or CCD bars) whose characteristics make them compatible with the fibers. In certain applications, such components can replace the input or output fibers of the multiplexer-demultiplexer of the invention and be placed instead of the extremities of the fibers. Such components are therefore equivalent to the fibers in the definition of the invention.

This multiplexer comprises input and output fibers 1, it is represented on FIG. 1 with one input fiber 2 and two output fibers 3, 4. These fibers are interlocked with a fiber-holder 5.

A dispersing element 6, here a grating, is carried by a grating bracket 7. The fiber-holder 5 and the network bracket 7 are in contact via an interface 8.

The mirror 9 reflects the radiations it receives, and is interconnected to a doublet, consisting of two elements 10 and 11 associated by an interface 12. The dispersing element 6 comprises a translucent central zone 13 and a diffracting peripheral zone 14.

Thus, the incoming light flux produced by the input optical fiber 2, after refraction by the diopter 8, and on the central zone 13 of the diffracting element 6, and after refraction by the doublet 10, 11, is reflected by the mirror 9 towards the peripheral zone 14 of the diffracting element 6. It is diffracted by this diffracting element 6, whereas this diffraction depends on the wavelength of the flux under consideration.

The diffracted fluxes are again reflected by the mirror 9 and, according to their wavelengths, coupled to the output fibers 3, 4.

The curve radii and indices of the doublet 10, 11 are determined so that the latter may correct the geometrical and chromatic aberrations of the assembly.

The space 15 between the diffracting element 6 and the first diopter 16 of the reflecting doublet is occupied by air or gas or vacuum.

The properties of the reflecting achromatic doublet are preferably as follows:

The first element 11 carrying the reflecting mirror 9 consists of a glass known under the reference BaF52, its center thickness is 7.66 mm, the curve of its face carrying the mirror is 401.56 mm and the curve of its second face is 748.90 mm.

The second element 10 of this doublet consists of a glass known under the reference PSK3, the curve of its second face is 217.77 mm, the distance between the interface 18 and the reflecting mirror is 271.6 mm. The material of the element 7 carrying the grating is silica. The distance of the face 18 to the extremity of the fiber-holder is 21.49 mm.

In this embodiment according to FIG. 1, the mean distance between the interfaces 13 and 8 is 22 mm and the distance between 13 and the reflecting mirror is 271.1 mm.

Assembly of both sub-assemblies, the one carrying the grating and that carrying the reflecting doublet, is performed using a tube of silica or of any other material with low expansion coefficient on which rest the faces 6 and 16.

The other embodiments will be described with reference to the FIGS. 2, 3 and 4 on which the elements, unchanged with respect to the first embodiment described above, have the same references.

In the second embodiment represented on FIG. 2, the engraved face 6 of the network is protected by a plane blade with parallel faces 17, at the center of which is placed a small prism 18 in contact by its internal face with the blade 17 and whose external face 19 is more or less perpendicular to the optical axis 20.

Thus, the light emitted from the fibers is not deviated, i.e. that each of the input fibers emits a diverging beam centered on the axis 20 and hence, onto the doublet 10, 11.

Thus, optimum and symmetrical use of the multiplexer-demultiplexer can be obtained.

According to the third embodiment represented on FIG. 3, the dispersing element 6 exhibits, in its central part, an aperture 21 which, also, prevents the deviation of the beams emitted by the input fibers and hence enable optimum use of the multiplexer-demultiplexer. Indeed, the diopter 8, in contact with the middle 15 in the central zone, at the aperture 21, is perpendicular to the optical axis 20.

Figure 4:
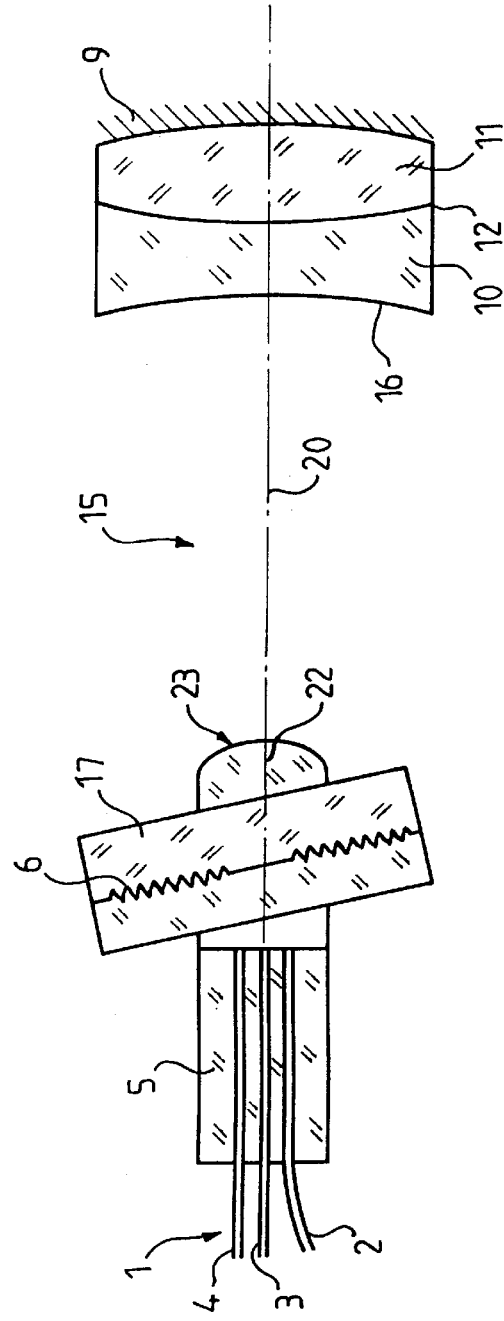
FIG. 4 represents a fourth embodiment.

In the fourth embodiment illustrated on FIG. 4, the network is protected by a blade 17, at the center of which lies an element 22 one face of which being in contact with the blade 17 and the other exhibiting a spherical diopter 23 centered on the optical axis 20 of the system.

The curve of the spherical surface 23 is such that the plane of the extremities of the fibers is located in the vicinity of one of the Young points (also called the Weierstrass points) of this diopter 22.

Advantageously, in these different embodiments, the plane of the input fibers is located in the vicinity of one of the Young points (or the Weierstrass points) of the input diopter 16 of the doublet 10, 11.

For a spherical diopter if curve radius R whose apex is S (intersection point of the optical axis with the diopter), separating the index middles respectively $n_2$ and $n_1$, the Young points (or the Weierstrass points) are the points located on the optical axis at distance respectively R $n_1/n_2$ and R $n_2/n_1$ from the apex S. It is well known that, for such points, the diopter under consideration does not produce any aberrations, it is stigmatic and aplanatic, at the same time.

When we specify that the plane of the fibers lies in the vicinity of one of the Young points, we mean that in the calculation of the optical combination produced in order to minimize the operations, the successive approximations will be made starting from a point located in the vicinity of one of the Young points. The conclusion of the calculation can lead to a slightly different position.

Thus, in the embodiment specified above, the glass referred to as PSK3 having an index n1=1.53867 and the surface having an index 1 for a radius R=217.117 mm, we obtain a Weierstrass point at the distance d from the apex equal to 335.07 mm. In practice, we obtain a system with minimized aberrations for the fibers positioned at an optical distance equal to 286.482 mm.

What is claimed is:

1. An optical fiber wavelength multiplexer-demultiplexer or router comprising an assembly including a dispersing system and a reflecting optical system having a focus, wherein extremities of input and output fibers are located in the vicinity of said focus, further comprising an optical doublet between said dispersing system and said reflective optical system correcting geometrical and chromatic aberrations of the assembly, the doublet being in direct contact with the reflecting optical system.

2. A multiplexer-demultiplexer or router according to claim 1, wherein the doublet has an input face having Young points and operates in the vicinity of the Young points of the input face.

3. A multiplexer-demultiplexer or router according to claim 1, wherein the dispersing system is a grating.

4. A multiplexer-demultiplexer or router according to claim 1, wherein the reflecting optical system is a concave mirror.

5. A multiplexer-demultiplexer or router according to claim 1, wherein the optical doublet is a doublet comprising two lenses, the second of which has a reflecting convex external face forming said reflecting optical system.

6. A multiplexer-demultiplexer or router according to claim 5, wherein the first lens is made of a glass known under the reference PSK3, and the second lens is made of a glass known under the reference BaF52.

7. A multiplexer-demultiplexer or router according to claim 6, wherein the second lens has a center thickness equal to 7.66 mm and radii of curvature of its external face, and of an internal face opposed to said external face which are respectively equal to 401.56 mm and to 748.90 mm, the first lens has a radii of curvature of its face opposed to the second lens which are equal and are 217.77 mm, and the external face of the second lens and the dispersing system are 271.1 mm apart.

8. A multiplexer-demultiplexer or router according to claim 1, wherein the reflecting optical system is plane.

9. A multiplexer-demultiplexer or router according to any of claims 1–8, wherein the dispersing system and the reflecting optical system, and the doublet are assembled by a material with a low expansion coefficient.

10. A multiplexer-demultiplexer or router according to claim 1, wherein the dispersing system and the reflecting optical system are separated by a non-solid space.

11. A multiplexer-demultiplexer or router according to claim 10, wherein said non-solid space is occupied by one of air, a gas, and vacuum.

12. An optical fiber wavelength multiplexer-demultiplexer or router comprising an assembly including a dispersing system and a reflecting optical system having a focus, wherein extremities of input and output fibers are located in the vicinity of said focus, further comprising an optical doublet between said dispersing system and said reflective optical system correcting geometrical and chromatic aberrations of the assembly, wherein the reflecting optical system is a concave mirror; the optical doublet is a doublet comprising two lenses, the second of which has a reflecting convex external face forming said reflecting optical system; and the first lens is made of a glass known under the reference PSK3, and the second lens is made of a glass known under the reference BaF52.

* * * * *